June 11, 1929.　　　E. F. PAWSAT　　　1,716,793
MIRROR FOR AUTOMOBILES
Filed July 13, 1925
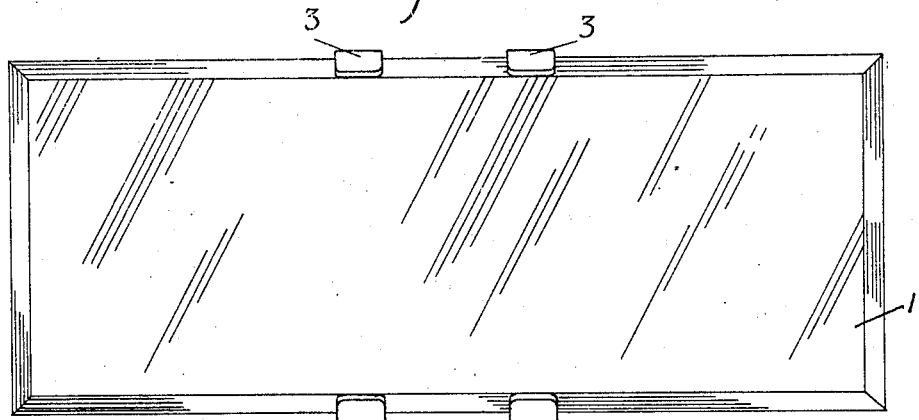
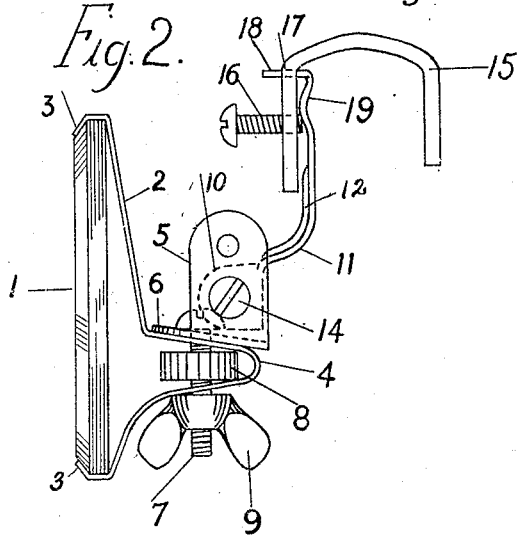
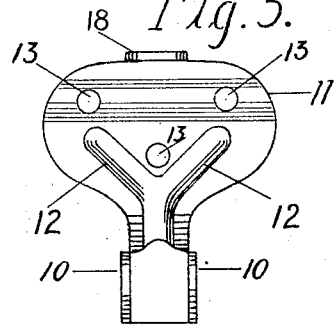
Inventor.
Ewald F. Pawsat,
By Arthur F. Ewald,
Attorney.

Patented June 11, 1929.

1,716,793

UNITED STATES PATENT OFFICE.

EWALD F. PAWSAT, OF MAYSVILLE, KENTUCKY, ASSIGNOR TO THE WALD MANUFACTURING COMPANY, OF MAYSVILLE, KENTUCKY, A CORPORATION OF KENTUCKY.

MIRROR FOR AUTOMOBILES.

Application filed July 13, 1925. Serial No. 43,223.

My invention relates to mirrors for motor vehicles, and has special reference to rear-view mirrors for automobiles.

The principal object of the present invention is to provide an improved bracket or support for rear-view mirror having provision for universal adjustments thereof.

Other objects of the invention will appear from the following detailed description thereof.

In the drawings:

Figure 1 is an elevation of a mirror in accordance with this invention.

Figure 2 is a side elevation of the mirror and bracket.

Figure 3 is an elevation of a detail.

The numeral 1 indicates a mirror of any suitable shape, said mirror is supported in a frame 2 which has fingers 3 engaging over the edges of the mirror, as clearly shown in Figure 1. The frame 2 contains a rearward projection 4 as shown in Figure 2. Mounted on the projection 4 of the frame 2 is a bifurcated bracket 5, the lower plate 6 of which is secured by means of a bolt 7 to the frame. A rubber washer 8 is interposed between the upper and lower walls of the projection 4 of frame 2 to prevent collapse of said projection when the wing nut 9 is tightened, and also to improve the rigidity of the rotary adjustments between the frame 2 and bracket 5. The bifurcations 5 of the bracket are provided with registering perforations by means of which the bracket is pivotally secured to the projections 10 of a supporting plate 11. The plate 11 is provided with ribs or bosses 12 for strengthening the same and also with perforations 13 for screws by means of which the plate may be secured to the frame or body of an automobile at a suitable location. A bolt 14 serving as a pivotal connection between the support 11 and bracket 5 also serves to secure the bracket and plate in suitable adjustment.

When the mirror is to be used in an open car in which only the frame of the windshield may be used for attachment, I provide a U-shaped plate 15 adapted to fit over the frame of the windshield, said plate is provided with a threaded perforation for a set screw 16 and also with a slot 17 for a projection 18 of the supporting plate 11. In order that the plate 11 may further engage rigidly the frame of the windshield it is provided with a groove 19 which gives the plate a firm and secure bearing against the frame.

The nature and use of the device will be apparent from the foregoing description to those skilled in the art to which the same appertains. In order to secure the same to the frame of a closed car the supporting plate 11 is attached to the frame at the desired point by means of screws. When so attached the mirror may be adjusted about the pivot bolts 7 and 14 to any desired angle and such adjustments secured by means of the wing nut 9 and the nut of bolt 14, as will be apparent. Where the device is to be secured to the windshield of an open car the plate 15 is placed over the frame, the projection 18 of plate 11 having previously been inserted through the slot 17. The frame of the windshield is thus clasped between one leg of the plate 11 and the plate 15, the groove 19 furnishing a rigid bearing. The device is then securely affixed to the windshield frame by means of tightening the set screws 16.

Having thus fully described my invention, what I claim as new and desire to secure by Letters Patent is:

A device of the character specified comprising in combination with a mirror, a frame arranged to support said mirror, said frame consisting of a plate having fingers adapted to engage above and below said mirror, said plate inclining away from the rear of the mirror between said fingers and having a V-shaped rearward extension, a supporting bracket, a bolt for pivotally securing said bracket to said V-shaped extension, said bolt extending through the walls of said extension so as to compress the same to secure said mirror in said fingers, and a compressible washer around said bolt inside said V-shaped extension.

EWALD F. PAWSAT.